US012597618B2

(12) United States Patent
Kim et al.

(10) Patent No.: US 12,597,618 B2
(45) Date of Patent: Apr. 7, 2026

(54) FUEL CELL VEHICLE, METHOD OF CONTROLLING STARTUP THEREOF, AND RECORDING MEDIUM STORING PROGRAM TO EXECUTE THE METHOD

(71) Applicants: Hyundai Motor Company, Seoul (KR); Kia Corporation, Seoul (KR)

(72) Inventors: Yoon Tae Kim, Gyeonggi-do (KR); Sae Kwon Chang, Gyeonggi-do (KR); Woo Young Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 616 days.

(21) Appl. No.: 18/125,297

(22) Filed: Mar. 23, 2023

(65) Prior Publication Data

US 2024/0055631 A1     Feb. 15, 2024

(30) Foreign Application Priority Data

Aug. 11, 2022    (KR) ........................ 10-2022-0100701

(51) Int. Cl.
| | |
|---|---|
| *H01M 8/04* | (2016.01) |
| *B60L 50/40* | (2019.01) |
| *B60L 50/50* | (2019.01) |
| *B60L 53/24* | (2019.01) |
| *H01M 8/04302* | (2016.01) |
| *H01M 8/04858* | (2016.01) |

(52) U.S. Cl.
CPC ......... *H01M 8/04302* (2016.02); *B60L 50/40* (2019.02); *B60L 50/50* (2019.02); *B60L 53/24* (2019.02); *H01M 8/0488* (2013.01); *B60L 2210/14* (2013.01); *H01M 2250/20* (2013.01)

(58) Field of Classification Search
CPC .......... H01M 8/04302; H01M 8/0488; H01M 2250/20; B60L 50/50; B60L 53/24; B60L 50/40; B60L 2210/14
USPC ........................................................ 429/429
See application file for complete search history.

(56) References Cited

U.S. PATENT DOCUMENTS

| | | | | |
|---|---|---|---|---|
| 2016/0288666 A1* | 10/2016 | Kim | ...................... | B60L 3/0092 |
| 2022/0111741 A1* | 4/2022 | Robb | ...................... | B60L 50/75 |

(Continued)

FOREIGN PATENT DOCUMENTS

| | | |
|---|---|---|
| KR | 10-2243561 B1 | 4/2021 |
| KR | 10-2366967 B1 | 2/2022 |

*Primary Examiner* — James M Erwin
(74) *Attorney, Agent, or Firm* — Fox Rothschild LLP

(57) ABSTRACT

A fuel cell vehicle of the disclosure includes a cell stack, a boost converter receiving a first target voltage from the cell stack, a supercapacitor, an initial charging converter receiving a second target voltage from the cell stack, a first switching unit configured to be switched in response to a first control signal to connect an output side of the boost converter to the supercapacitor, a second switching unit configured to be switched in response to a second control signal to connect an output side of the cell stack to the initial charging converter, and a controller configured to generate the first and second control signals in order to connect the output side of the boost converter to the supercapacitor while the output from the initial charging converter is charged in the supercapacitor so that the supercapacitor is charged until startup is completed by receiving the first target voltage.

12 Claims, 5 Drawing Sheets

(56) References Cited

U.S. PATENT DOCUMENTS

| 2023/0104735 A1* | 4/2023 | Lipponen | H01M 8/04559 |
| | | | 307/75 |
| 2023/0256843 A1* | 8/2023 | Esteghlal | H02M 1/36 |
| | | | 307/9.1 |

* cited by examiner

FUEL CELL VEHICLE, METHOD OF CONTROLLING STARTUP THEREOF, AND RECORDING MEDIUM STORING PROGRAM TO EXECUTE THE METHOD

CROSS REFERENCE TO RELATED APPLICATIONS

This application claims, under 35 U.S.C. § 119(a), the benefit of Korean Patent Application No. 10-2022-0100701, filed on Aug. 11, 2022, which is hereby incorporated by reference in entirety.

BACKGROUND OF THE DISCLOSURE

Field of the Disclosure

Embodiments relate to a fuel cell vehicle, a method of controlling startup thereof, and a recording medium storing a program to execute the method.

Background

In a vehicle equipped with a fuel cell including a cell stack, a battery or a supercapacitor is charged with power generated in the fuel cell, and a load of the fuel cell vehicle, such as a motor, is driven using power charged in the battery or the supercapacitor.

In general, a fuel cell vehicle includes a boost converter, which boosts a stack voltage generated in a fuel cell, and a supercapacitor. If the level of voltage charged in the supercapacitor is lower than the level of the stack voltage, overcurrent may result, which may damage the boost converter. In order to prevent this problem, the supercapacitor needs to be charged. However, when the fuel cell vehicle is started up, the level of voltage charged in the supercapacitor is lower than the level of the stack voltage, and thus the time required for completing startup by charging the supercapacitor increases. Therefore, research with the goal of addressing this problem is underway.

Various related art documents may include: (Patent Document 0001) Korean Patent Laid-Open Publication No. 10-2019-0061955 (published on Jun. 5, 2019) and (Patent Document 0002) Korean Patent Registration No. 10-2366967 (registered on Feb. 21, 2022).

SUMMARY OF THE DISCLOSURE

Accordingly, embodiments are directed to a fuel cell vehicle, a method of controlling startup thereof, and a recording medium storing a program to execute the method that substantially obviate one or more problems due to limitations and disadvantages of the related art.

Embodiments provide a fuel cell vehicle capable of completing startup within a short time, a method of controlling startup thereof, and a recording medium storing a program to execute the method.

However, the objects to be accomplished by the embodiments are not limited to the above-mentioned objects, and other objects not mentioned herein will be clearly understood by those skilled in the art from the following description.

A fuel cell vehicle according to an embodiment may include a cell stack including a plurality of stacked unit cells, a boost converter configured to receive and boost a first target voltage from the cell stack and to output a boosted first target voltage, a supercapacitor, an initial charging converter configured to receive and boost a second target voltage from the cell stack and to output a boosted second target voltage, a first switching unit configured to be switched in response to a first control signal to connect an output side of the boost converter to the supercapacitor, a second switching unit configured to be switched in response to a second control signal to connect an output side of the cell stack to the initial charging converter, and a controller configured to generate the first control signal and the second control signal in order to connect the output side of the boost converter to the supercapacitor while the output from the initial charging converter is charged in the supercapacitor so that the supercapacitor is charged until startup is completed by receiving the first target voltage from the cell stack.

In an example, the fuel cell vehicle may further include a load configured to be connected to the output side of the boost converter in response to a switching operation of the first switching unit.

In an example, the second target voltage may have a level higher than the level of the first target voltage.

In an example, if the level of a capacitor voltage charged in the supercapacitor is equal to or lower than the level of a stack voltage output from the cell stack, the controller may generate the second control signal to connect the output side of the cell stack to the initial charging converter. If the level of the capacitor voltage exceeds the level of the stack voltage and the supercapacitor is being charged, the controller may generate the first control signal to connect the output side of the boost converter to the supercapacitor. If the boost converter has received the first target voltage from the cell stack and the output side of the boost converter is connected to the supercapacitor, the controller may generate the second control signal to disconnect the output side of the cell stack from the initial charging converter.

In an example, the level of the capacitor voltage may be determined to exceed the level of the stack voltage if the initial charging converter has received the second target voltage from the cell stack.

In an example, the second target voltage may be determined in consideration of the minimum value of the duty ratio of the boost converter, and the duty ratio may be the duty ratio of a pulse width modulation (PWM) signal that drives the boost converter.

According to another embodiment, a method of controlling startup of a fuel cell vehicle, is disclosed. The method may include the step of providing a cell stack including a plurality of stacked unit cells, a boost converter configured to receive a first target voltage from the cell stack, a supercapacitor, and an initial charging converter configured to receive a second target voltage from the cell stack. The method may include connecting an output side of the cell stack to the initial charging converter to charge the supercapacitor if startup of the fuel cell vehicle is requested and the level of a capacitor voltage charged in the supercapacitor is equal to or lower than the level of a stack voltage output from the cell stack, connecting an output side of the boost converter to the supercapacitor to charge the supercapacitor if the level of the capacitor voltage exceeds the level of the stack voltage and the supercapacitor is being charged, and disconnecting the output side of the cell stack from the initial charging converter to complete startup if the boost converter has received the first target voltage from the cell stack and the output side of the boost converter is connected to the supercapacitor.

In an example, the second target voltage may have a level higher than the level of the first target voltage.

In an example, the method may further include determining that the level of the capacitor voltage exceeds the level of the stack voltage if the initial charging converter has received the second target voltage from the cell stack.

In an example, the method may further include automatically stopping operation of the initial charging converter if the boost converter has received the first target voltage from the cell stack and the output side of the boost converter is connected to the supercapacitor.

According to still another embodiment, a recording medium comprising a memory storage having a program to execute a method of controlling startup of a fuel cell vehicle is disclosed. The vehicle may include a cell stack including a plurality of stacked unit cells, a boost converter configured to receive a first target voltage from the cell stack, a supercapacitor, and an initial charging converter configured to receive a second target voltage from the cell stack. The program may be configured to implement a function of connecting an output side of the cell stack to the initial charging converter to charge the supercapacitor if startup of the fuel cell vehicle is requested and the level of a capacitor voltage charged in the supercapacitor is equal to or lower than the level of a stack voltage output from the cell stack, a function of connecting an output side of the boost converter to the supercapacitor if the level of the capacitor voltage exceeds the level of the stack voltage and the supercapacitor is being charged, and a function of disconnecting the output side of the cell stack from the initial charging converter to complete startup if the boost converter has received the first target voltage from the cell stack and the output side of the boost converter is connected to the supercapacitor. The recording medium may be read by a computer system.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE DISCLOSURE

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above", and "under/lower part/below", are used only to distinguish between one subject or element and another subject or element, without necessarily requiring or involving any physical or logical relationship or sequence between the subjects or elements.

Hereinafter, a vehicle including a fuel cell (hereinafter referred to as a "fuel cell vehicle") according to an embodiment will be described with reference to the accompanying drawings.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
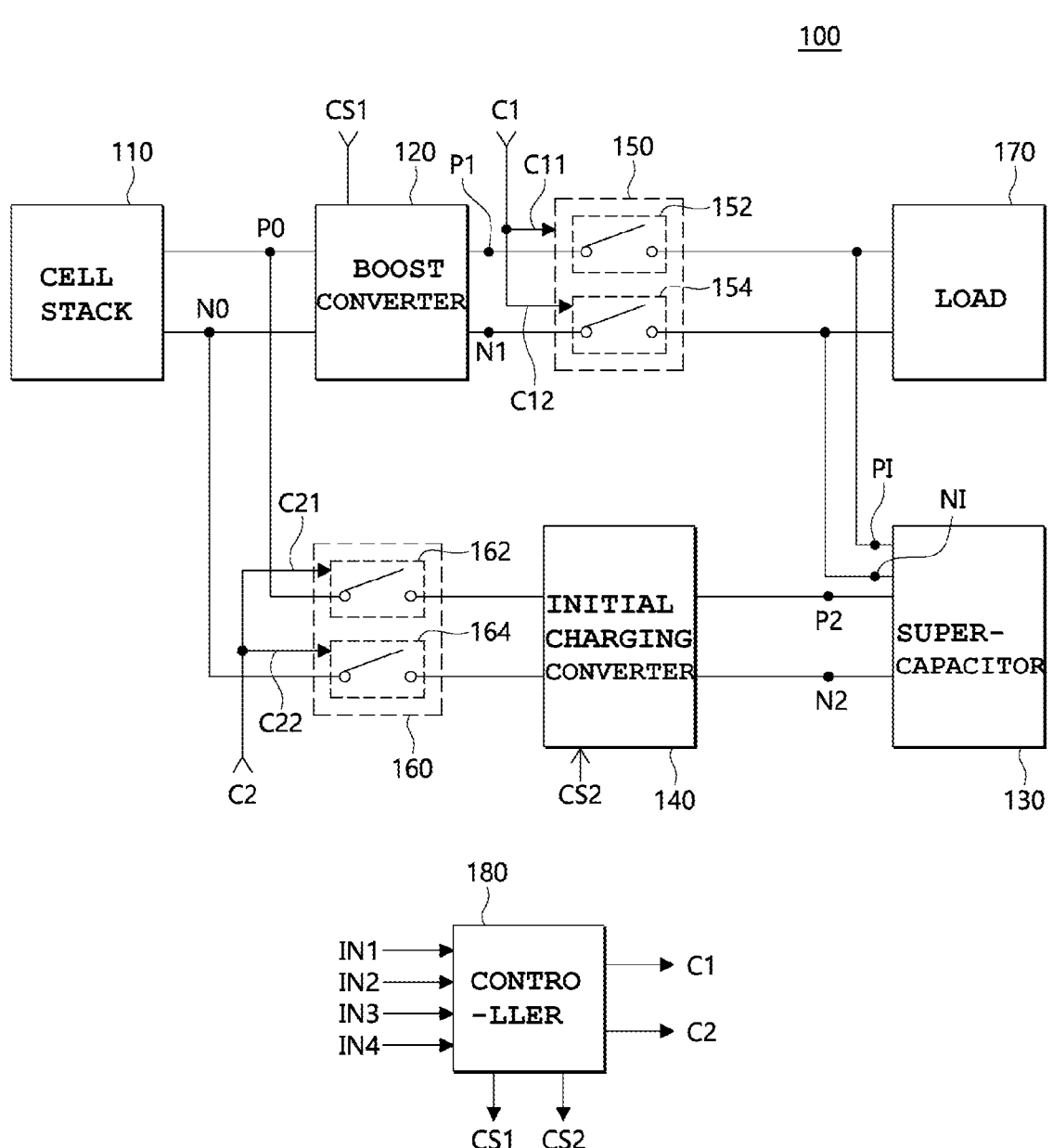
FIG. 1 is a block diagram of a fuel cell vehicle according to an embodiment.

FIG. 1 is a block diagram of a fuel cell vehicle 100 according to an embodiment.

The fuel cell vehicle 100 according to the embodiment may include a cell stack 110, a boost converter 120, an initial charging converter 140, a supercapacitor 130, first and second switching units 150 and 160, and a controller 180. In addition, the fuel cell vehicle 100 according to the embodiment may further include a load 170.

First, an example of a fuel cell that may be included in the fuel cell vehicle 100 will be described below in brief. However, the embodiments are not limited to any specific form of fuel cell included in the fuel cell vehicle 100.

The fuel cell may be a polymer electrolyte membrane fuel cell (or a proton exchange membrane fuel cell) (PEMFC), which has been studied most extensively as a power source for driving vehicles. The fuel cell may include a cell stack 110.

The cell stack 110 may include a plurality of unit cells, which are stacked on one another in a first direction. Each unit cell may generate 0.6 volts to 1.0 volts of electricity, on average 0.7 volts of electricity. The number of unit cells may be determined based on the intensity of the power that is to be generated in the fuel cell.

The first direction may be the direction in which the fuel cell vehicle 100 travels, or may be a direction intersecting the direction in which the fuel cell vehicle 100 travels.

The voltage VS generated and output from the cell stack 110 (hereinafter referred to as the "stack voltage") corresponds to the potential difference between an output terminal PO of a positive-electrode side of the cell stack 110 and an output terminal NO of a negative-electrode side of the cell stack 110.

The boost converter 120 may be a kind of DC/DC converter that converts the DC-type input voltage into a DC-type output voltage having a level higher than the level of the DC-type input voltage. The boost converter 120 may boost the output from the cell stack 110 and may output the same. For example, the output voltage VO of the boost converter 120 may be expressed using the following equation 1.

$$VO = VI \times R \qquad \text{[Equation 1]}$$

Here, VI represents the input voltage of the boost converter 120, and R represents the boosting ratio of the boost converter 120.

In Equation 1, VO is a fixed value. Accordingly, when the input voltage VI decreases, the boosting ratio R increases, and when the input voltage VI increases, the boosting ratio R decreases.

For example, referring to FIG. 1, the boost converter 120 may receive a target voltage (hereinafter referred to as a "first target voltage") VT1 from the cell stack 110, and may boost and output the same. Here, extracting the first target voltage may mean extracting an amount of energy equivalent to the first target voltage, and may also mean following a first target voltage command. That is, the boost converter 120 may continuously extract energy from the cell stack 110 until an amount of energy equivalent to the first target voltage is input from the cell stack 110 to the boost converter 120. Here, the first target voltage may be the voltage on the input side of the boost converter 120. The boost converter 120 may extract an amount of energy equivalent to the first target voltage VT1 from the cell stack 110 in response to a first driving control signal CS1 output from the controller 180. The voltage output from the boost converter 120 corresponds to the potential difference between an output terminal P1 of a positive-electrode side thereof and an output terminal N1 of a negative-electrode side thereof.

The cell stack 110 may be a passive device, which provides an amount of energy equivalent to the first target voltage required for the boost converter 120 at the request of the boost converter 120.

However, the embodiments are not limited to any specific operation of the boost converter 120. That is, the boost converter 120 shown in FIG. 1 may perform a function corresponding to that of a DC/DC converter that is generally used in a fuel cell vehicle.

Figure 2:
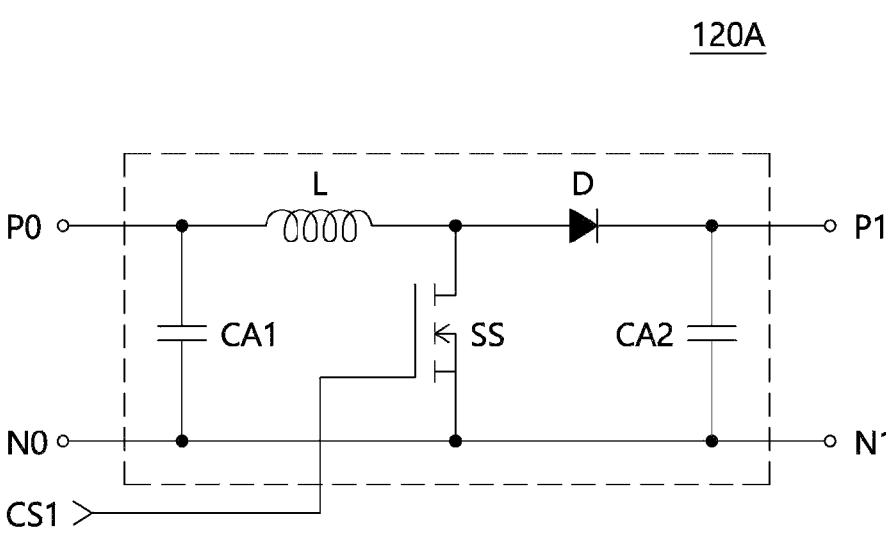
FIG. 2 is a circuit diagram of an embodiment of the boost converter shown in FIG. 1.

FIG. 2 is a circuit diagram of an embodiment 120A of the boost converter 120 shown in FIG. 1.

The boost converter 120 shown in FIG. 1 is not limited to the embodiment 120A shown in FIG. 2.

The boost converter 120A shown in FIG. 2 may include first and second capacitors CA1 and CA2, an inductor L, a diode D, and a semiconductor switch SS.

The first capacitor CA1 may be disposed between an output terminal PO of a positive-electrode side of the cell stack 110 and an output terminal NO of a negative-electrode side of the cell stack 110.

The inductor L has one end connected to the output terminal PO of the positive-electrode side of the cell stack 110 and another end connected to a positive electrode of the diode D. That is, the inductor L is disposed between the output terminal PO of the positive-electrode side of the cell stack 110 and a positive electrode of the diode D.

The diode D has a positive electrode connected to the other end of the inductor L.

The second capacitor CA2 may be disposed between the negative electrode of the diode D and the output terminal NO of the negative-electrode side of the cell stack 110.

The first and second capacitors CA1 and CA2 are smoothing capacitors.

The semiconductor switch SS may be switched on (or turned on) or switched off (or turned off) in response to a first driving control signal CS1, and may be disposed between the positive electrode of the diode D and the output terminal NO of the negative-electrode side of the cell stack 110 so as to be connected thereto.

The semiconductor switch SS may be implemented as an insulated gate bipolar transistor (IGBT) or a field effect transistor (FET). For example, as illustrated in FIG. 2, the semiconductor switch SS may be implemented as a transistor. The transistor may include a gate G connected to the first driving control signal CS1, a drain D connected to the positive electrode of the diode D, and a source S connected to the output terminal NO of the negative-electrode side of the cell stack 110.

The operation of the boost converter 120A having the above-described configuration will be described below.

As will be described later, while the supercapacitor 130 is being charged, the transistor, which is the semiconductor switch SS, is turned on in response to the first driving control signal CS1 output from the controller 180 when the level of voltage VC charged in the supercapacitor 130 (hereinafter referred to as "capacitor voltage") exceeds the level of the stack voltage VC, and may receive the first target voltage from the cell stack 110. Here, receiving the first target voltage may mean receiving an amount of energy equivalent to the first target voltage.

The cell stack 110 serves to generate the main power required for the fuel cell vehicle 100, and the supercapacitor 130 serves to generate the auxiliary power required for the fuel cell vehicle 100. Therefore, an amount of energy equivalent to the capacitor voltage VC may be supplied to the load 170 as auxiliary power.

Referring back to FIG. 1, the initial charging converter 140 may extract a predetermined target voltage (hereinafter referred to as a "second target voltage") VT2 from the cell stack 110, and may output the same to the supercapacitor 130.

According to an embodiment, the second target voltage VT2 has a level higher than the level of the first target voltage VT1.

Here, extracting the second target voltage may mean extracting an amount of energy equivalent to the second target voltage, and may also mean following a second target voltage command. That is, the initial charging converter 140 may continuously extract energy from the cell stack 110 until an amount of energy equivalent to the second target voltage is input from the cell stack 110 to the initial charging converter 140. Here, the second target voltage may be the voltage on the input side of the initial charging converter 140.

The cell stack 110 may be a passive device, which provides an amount of energy equivalent to the second target voltage required for the initial charging converter 140 at the request of the initial charging converter 140. To this end, the initial charging converter 140 may extract an amount of energy equivalent to the second target voltage VT2 from the cell stack 110 in response to a second driving control signal CS2 output from the controller 180. The voltage output from the initial charging converter 140 may correspond to the potential difference between an output terminal P2 of a positive-electrode side thereof and an output terminal N2 of a negative-electrode side thereof.

For example, the initial charging converter 140 may be implemented as a buck/boost converter. The buck/boost converter may operate as a buck converter when the capacitor voltage VC is less than the stack voltage VS, and may operate as a boost converter when the capacitor voltage VC is greater than the stack voltage VS. That is, the initial charging converter 140 operates as a buck converter or a boost converter depending on the magnitude of the capacitor voltage VC and the magnitude of the stack voltage VS. Since the circuit configuration of the initial charging converter 140 is well known in the art, a detailed description thereof will be omitted. Therefore, the embodiments are not limited to any specific configuration of the initial charging converter 140.

The first switching unit 150 has one side connected to the boost converter 120 and another side connected to the supercapacitor 130. The first switching unit 150 may be switched on in response to a first control signal C1 to connect the output side of the boost converter 120 to the supercapacitor 130 and to the load 170.

To this end, the first switching unit 150 may include 1-1$^{st}$ and 1-2$^{nd}$ switches 152 and 154. The 1-1$^{st}$ switch 152 is disposed between the output terminal P1 of the positive-electrode side of the boost converter 120 and the input terminal PI of the positive-electrode side of the supercapacitor 130 so as to be connected thereto, and is switched on or off in response to a 1-1$^{st}$ control signal C11. The 1-2$^{nd}$ switch 154 is disposed between the output terminal N1 of the negative-electrode side of the boost converter 120 and the input terminal NI of the negative-electrode side of the supercapacitor 130 so as to be connected thereto, and is switched on or off in response to a 1-2$^{nd}$ control signal C12. The first control signals C1 (C11 and C12) may be generated in the controller 180.

The second switching unit 160 has one side connected to the cell stack 110 and another side connected to the initial charging converter 140. The second switching unit 160 may be switched on in response to a second control signal C2 to connect the output side of the cell stack 110 to the initial charging converter 140.

To this end, the second switching unit 160 may include 2-1$^{st}$ and 2-2$^{nd}$ switches 162 and 164. The 2-1$^{st}$ switch 162 is disposed between the output terminal P0 of the positive-electrode side of the cell stack 110 and the input terminal of the positive-electrode side of the initial charging converter 140 so as to be connected thereto, and is switched on or off in response to a 2-1$^{st}$ control signal C21. The 2-2$^{nd}$ switch 164 is disposed between the output terminal NO of the negative-electrode side of the cell stack 110 and the input terminal of the negative-electrode side of the initial charging converter 140 so as to be connected thereto, and is switched on or off in response to a 2-2$^{nd}$ control signal C22. The second control signals C2 (C21 and C22) may be generated in the controller 180.

According to an embodiment, the controller 180 may generate the first and second control signals C1 and C2 in order to connect the output side of the boost converter 120 to the supercapacitor 130 while the output from the initial charging converter 140 is charged in the supercapacitor 130, whereby the supercapacitor 130 is charged until startup is completed by receiving the first target voltage VT1 from the cell stack 110.

Specifically, the controller 180 determines whether startup of the fuel cell vehicle 100 is requested through an input terminal IN1. A start-on command may be provided to the controller 180 through the input terminal IN1. For example, when a user desires to start the fuel cell vehicle 100, a start-on command may be generated in an interface (not shown), which is manipulated by the user, and may be provided to the controller 180.

Upon receiving a request for startup of the fuel cell vehicle, the controller 180 determines whether the level of the capacitor voltage VC charged in the supercapacitor 130 is equal to or lower than the level of the stack voltage VS output from the cell stack 110. To this end, the controller 180 may receive the stack voltage VS or a value for obtaining the stack voltage VS through an input terminal IN2, and may receive the capacitor voltage VC or a value for obtaining the capacitor voltage VC through an input terminal IN3.

When the level of the capacitor voltage VC is equal to or lower than the level of the stack voltage VS, the controller 180 generates the second control signal C2 to switch on (or turn on) the second switching unit 160 in order to connect the output side of the cell stack 110 to the initial charging converter 140.

In addition, when the level of the capacitor voltage VC exceeds the level of the stack voltage VS while the supercapacitor 130 is being charged, the controller 180 generates the first control signal C1 to switch on (or turn on) the first switching unit 150 in order to connect the output side of the converter 120 to the supercapacitor 130.

The second target voltage VT2 may be determined in consideration of the minimum value of the duty ratio of the boost converter 120. Here, the duty ratio may be the duty ratio of a pulse width modulation (PWM) signal that drives the boost converter 120. For example, the second target voltage VT2 may be set as expressed in the following Equation 2.

$$VT2(=VS+\text{Max}V)<VC \qquad \text{[Equation 2]}$$

Here, MaxV represents a minimum duty ratio voltage.

In the case in which the second target voltage VT2 is set as described above, when the initial charging converter 140 has extracted and received the second target voltage from the cell stack 110, the controller 180 may determine that the level of the capacitor voltage VC is higher than the level of the stack voltage VS, and may turn on the first switching unit 150.

Thereafter, the controller 180 determines whether the boost converter 120 has received the first target voltage VT1 from the cell stack 110 while the output side of the boost converter 120 is connected to the supercapacitor 130. To this end, the controller 180 may receive the level of the voltage extracted by the boost converter 120 from the cell stack 110 or a value for obtaining the level through an input terminal IN4. When the boost converter 120 has received the first target voltage VT1 from the cell stack 110, the controller 180 generates the second control signal C2 to turn off the second switching unit 160 in order to disconnect the output side of the cell stack 110 from the initial charging converter 140, thereby completing startup of the fuel cell vehicle 100.

After startup is completed, the first switching unit 150 is maintained in the turned-on state. Accordingly, the output from the boost converter 120 may be provided to the load 170, the battery (not shown), or peripheral auxiliary devices (balance of plant (BOP)) (not shown), which assists in operation of the cell stack 110.

When the first switching unit 150 is switched on to form a main path, the load 170 may be connected to the main path to receive the output from the boost converter 120. Alternatively, the load 170 may receive the capacitor voltage VC charged in the supercapacitor 130 regardless of whether the first switching unit 150 forms a main path.

For example, the load 170 may include an inverter (not shown) and a motor (not shown).

The inverter is connected to the output terminal P1 of the positive-electrode side of the boost converter 120 and to the output terminal N1 of the negative-electrode side of the boost converter 120, converts the received DC-type voltage or the DC-type capacitor voltage charged in the supercapacitor 130 into AC-type voltage depending on the travel state of the fuel cell vehicle 100, and outputs the AC-type voltage to the motor.

The motor may be driven in response to the AC-type voltage output from the inverter. That is, the motor may rotate upon receiving the AC voltage for the motor from the inverter, and thus may serve to drive the fuel cell vehicle 100. For example, the motor may be a three-phase AC rotating device including a rotor in which a permanent magnet is embedded, but the embodiments are not limited to any specific form of the motor.

In addition, although not shown, the load 170 of the fuel cell vehicle 100 may include parts necessary for driving the vehicle, such as a motor-driven power steering (MDPS) device, a radiator fan, and headlights. These various parts included in the load 170 may be driven upon receiving the voltage output from the boost converter 120 or the capacitor voltage VC charged in the super capacitor 130 as driving voltage.

Hereinafter, a method of controlling startup of a fuel cell vehicle according to an embodiment will be described with reference to FIGS. 1 and 3. However, the embodiments are not limited to what is shown in FIG. 3.

Figure 3:
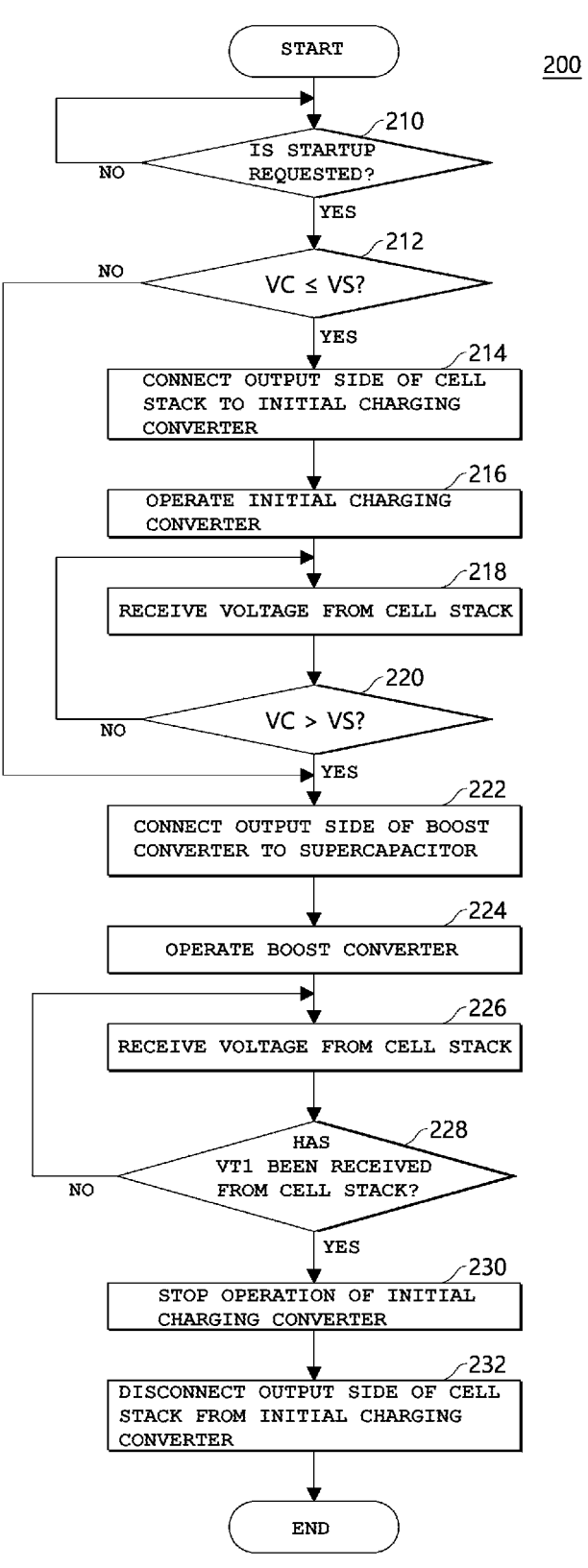
FIG. 3 is a flowchart for explaining a startup control method according to an embodiment.

Further, the startup control method 200 according to the embodiment shown in FIG. 3 may be performed by the fuel cell vehicle 100 shown in FIG. 1, but the embodiments are not limited thereto. That is, according to another embodiment, the startup control method 200 according to the embodiment shown in FIG. 3 may also be performed by a fuel cell vehicle configured differently from the fuel cell vehicle 100 shown in FIG. 1.

Alternatively, the fuel cell vehicle 100 (e.g. the controller 180) shown in FIG. 1 may perform the startup control method 200 according to the embodiment shown in FIG. 3, but the embodiments are not limited thereto. That is, according to another embodiment, the fuel cell vehicle 100 shown in FIG. 1 may also perform a startup control method configured differently from the startup control method 200 according to the embodiment shown in FIG. 3.

FIG. 3 is a flowchart for explaining the startup control method 200 according to the embodiment.

First, a determination is made as to whether startup of the fuel cell vehicle 100 is requested (step 210).

When startup of the fuel cell vehicle 100 is requested, a determination is made as to whether the level of the capacitor voltage VC charged in the supercapacitor 130 is equal to or lower than the level of the stack voltage VS output from the cell stack 110 (step 212). If the boost converter 120 is operated when the level of the capacitor voltage VC is equal to or lower than the level of the stack voltage VS, the boost converter 120 or the first switching unit 150 may be damaged.

When the level of the capacitor voltage VC is equal to or lower than the level of the stack voltage VS, the output side of the cell stack 110 is connected to the initial charging converter 140 (step 214).

Steps 210 to 214 may be performed by the controller 180. For example, in order to perform step 214, the controller 180 may generate the second control signal C2 so that the second switching unit 160 shown in FIG. 1 is switched on.

When the output side of the cell stack 110 is connected to the initial charging converter 140 in step 214, the initial charging converter 140 starts operating (step 216). Hereinafter, for convenience of description, the state in which the initial charging converter 140 is operating will be expressed as an on state, and the state in which the initial charging converter 140 is not operating will be expressed as an off state.

After step 216, the initial charging converter 140 receives voltage from the cell stack 110 (step 218).

Through steps 214 to 218, the voltage (i.e. energy) supplied to the initial charging converter 140 from the cell stack 110 may be charged in the supercapacitor 130.

While the supercapacitor 130 is being charged, a determination is made as to whether the level of the capacitor voltage VC is higher than the level of the stack voltage VS (step 220).

For example, in order to perform step 220, a determination may be made as to whether the initial charging converter 140 has received the second target voltage from the cell stack 110. That is, when the initial charging converter 140 has received the second target voltage from the cell stack 110, it may be determined that the level of the capacitor voltage VC is higher than the level of the stack voltage VS.

When the level of the capacitor voltage VC is not higher than the level of the stack voltage VS, the process proceeds to step 218 to perform an operation of following a command related to the second target voltage TV2. That is, when the initial charging converter 140 has not extracted the second target voltage VT2 from the cell stack 110, the initial charging converter 140 continuously receives voltage (i.e. energy) from the cell stack 110.

However, when the level of the capacitor voltage VC is higher than the level of the stack voltage VS in step 212 or 220, the output side of the boost converter 120 is connected to the supercapacitor 130 (step 222). That is, when the level of the capacitor voltage VC is higher than the level of the stack voltage VS, current does not flow between the boost converter 120 and the supercapacitor 130 due to the diode D included in the boost converter 120. Therefore, the first switching unit 150 may be switched on (or turned on) without damage to the booster converter 120 or the first switching unit 150.

Steps 220 and 222 may be performed by the controller 180.

After step 222, the boost converter 120 starts operating (step 224). Hereinafter, for convenience of description, the state in which the boost converter 120 operates will be expressed as an on state, and the state in which the boost converter 120 stops operating will be expressed as an off state.

After step 224, the boost converter 120 receives voltage from the cell stack 110 (step 226).

As described above, the level of the first target voltage VT1 is set to be lower than the level of the second target voltage VT2. The reason for this is as follows.

Due to the characteristics of the cell stack 110, when the target voltage of each of the booster converter 120 and the initial charge converter 140 is high, the level of current that each of the boost converter 120 and the initial charging converter 140 extracts from the cell stack 110 is low. Considering these characteristics, when the level of the first target voltage VT1 is higher than the level of the second target voltage VT2, current is continuously supplied to the initial charging converter 140, and thus the operation of the initial charging converter 140 is not stopped, but is performed normally. However, because the level of current supplied to the boost converter 120 gradually decreases, the boost converter 120 ultimately becomes incapable of operating, and thus a startup completion condition (i.e. a condition in which the initial charging converter 140 is turned off and the boost converter 120 is turned on) is not satisfied.

Through steps 222 to 226, the voltage (i.e. energy) supplied to the boost converter 120 from the cell stack 110 may be charged in the supercapacitor 130.

After step 226, that is, while the output side of the boost converter 120 is connected to the supercapacitor 130, a determination is made as to whether the boost converter 120 has received the first target voltage from the cell stack 110 (step 228).

When the boost converter 120 has not extracted the first target voltage from the cell stack 110, the process proceeds to step 226 to perform an operation of following a command related to the first target voltage VT1, and the boost converter 120 continuously receives voltage from the cell stack 110.

However, when the boost converter 120 has extracted the first target voltage VT1 from the cell stack 110, the initial charging converter 140 stops operating (step 230).

Due to the above-described characteristics of the cell stack 110 whereby voltage is increased when current is reduced, when the boost converter 120 has extracted the first target voltage VT1 from the cell stack 110, the initial charging converter 140 continues to extract the second target voltage VT2 from the cell stack 110. Accordingly, the current supplied to the initial charging converter 140 gradually decreases and approaches zero, and thus the initial charging converter 140 is turned off.

As described above, when the boost converter 120 has received the first target voltage from the cell stack 110 while the output side of the boost converter 120 is connected to the supercapacitor 130, the initial charging converter 140 may automatically stop operating.

After step 230, the cell stack 110 is disconnected from the initial charging converter 140 to complete startup (step 232).

Steps 228 and 232 may be performed by the controller 180. For example, the controller 180 may perform step 232 by generating the second control signal C2 to switch off (or turn off) the second switching unit 160.

Even after startup is completed, the first switching unit 150 may be maintained in an on state, and thus the output from the boost converter 120 may be supplied to the load 170.

Meanwhile, the fuel cell vehicle 100 according to the embodiment may include various kinds of electronic control units (ECUs). Each of the ECUs is a kind of computer having therein software capable of performing various functions for the fuel cell vehicle 100. The startup control method 200 according to the above-described embodiment may be executed by the ECUs.

A recording medium in which a program for executing the startup control method 200 performed by the fuel cell vehicle 100 is recorded may store a program to implement a function of connecting the output side of the cell stack 110 to the initial charging converter 140 to charge the supercapacitor 130 when startup of the fuel cell vehicle 100 is requested and the level of the capacitor voltage VC charged in the supercapacitor 130 is equal to or lower than the level of the stack voltage VS output from the cell stack 110, a function of connecting the output side of the boost converter 120 to the supercapacitor 130 when the level of the capacitor voltage VC exceeds the level of the stack voltage VS while the supercapacitor 130 is being charged, and a function of disconnecting the output side of the cell stack 110 from the initial charging converter 140 to complete startup when the boost converter 120 has received the first target voltage VT1 from the cell stack 110 while the output side of the boost converter 120 is connected to the supercapacitor 130. The recording medium may be read by a computer system. In various embodiments, the recording medium may comprise a memory storage.

The computer-readable recording medium may encompass all kinds of storage devices in which data that may be read by a computer system is stored. Examples of the computer-readable recording medium may include ROM, RAM, a CD-ROM, a magnetic tape, a floppy disk, and an optical data storage device. The computer-readable recording medium may also be distributed over network-coupled computer systems so that the computer-readable code is stored and executed in a distributed fashion. Also, functional programs, code, and code segments for accomplishing the above-described startup control method may be easily construed by programmers skilled in the art to which the present disclosure pertains.

Hereinafter, a startup control method of a fuel cell vehicle according to a comparative example and the startup control method of the fuel cell vehicle 100 according to the embodiment will be described. For convenience of description and better understanding of the comparative example, it is assumed that the startup control method according to the comparative example is also performed by the fuel cell vehicle 100 shown in FIG. 1.

Figure 4:
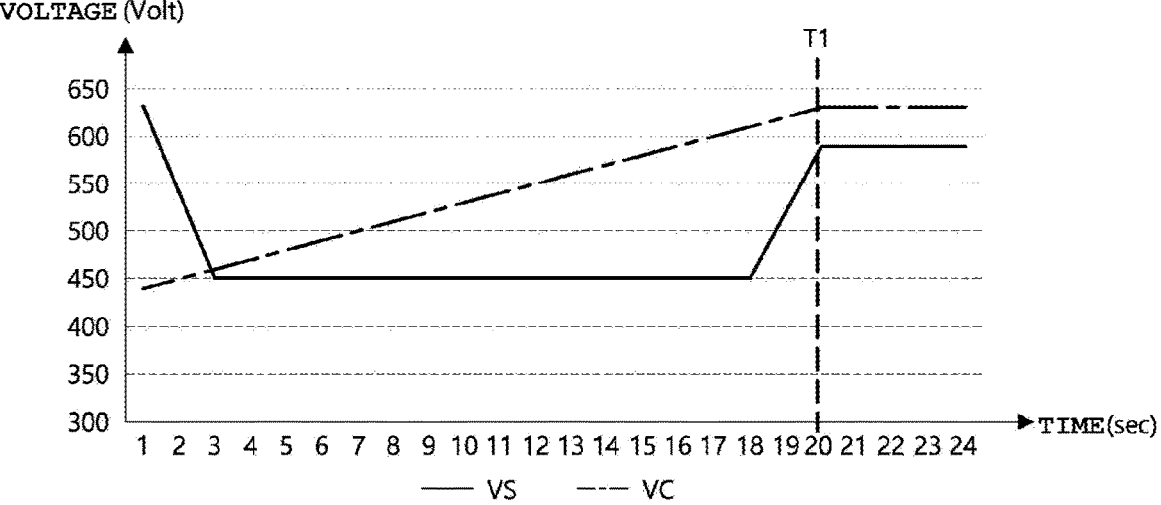
FIG. 4 is a graph for explaining a startup control method according to a comparative example.
Figure 5:
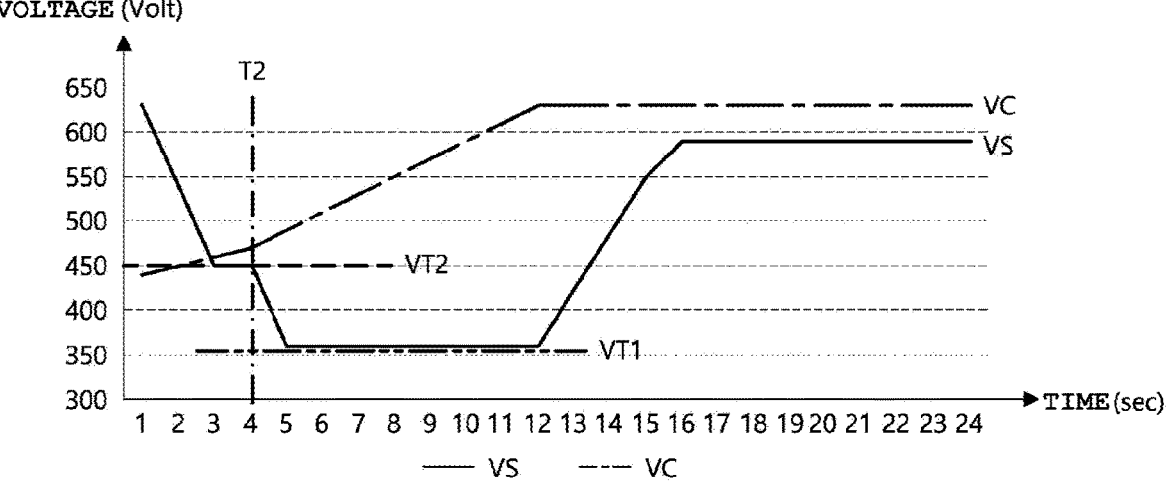
FIG. 5 is a graph for explaining the startup control method according to the embodiment.

FIG. 4 is a graph for explaining the startup control method according to the comparative example, and FIG. 5 is a graph for explaining the startup control method 200 according to the embodiment. In each of the graphs, the horizontal axis represents time, and the vertical axis represents voltage.

Figure 6:
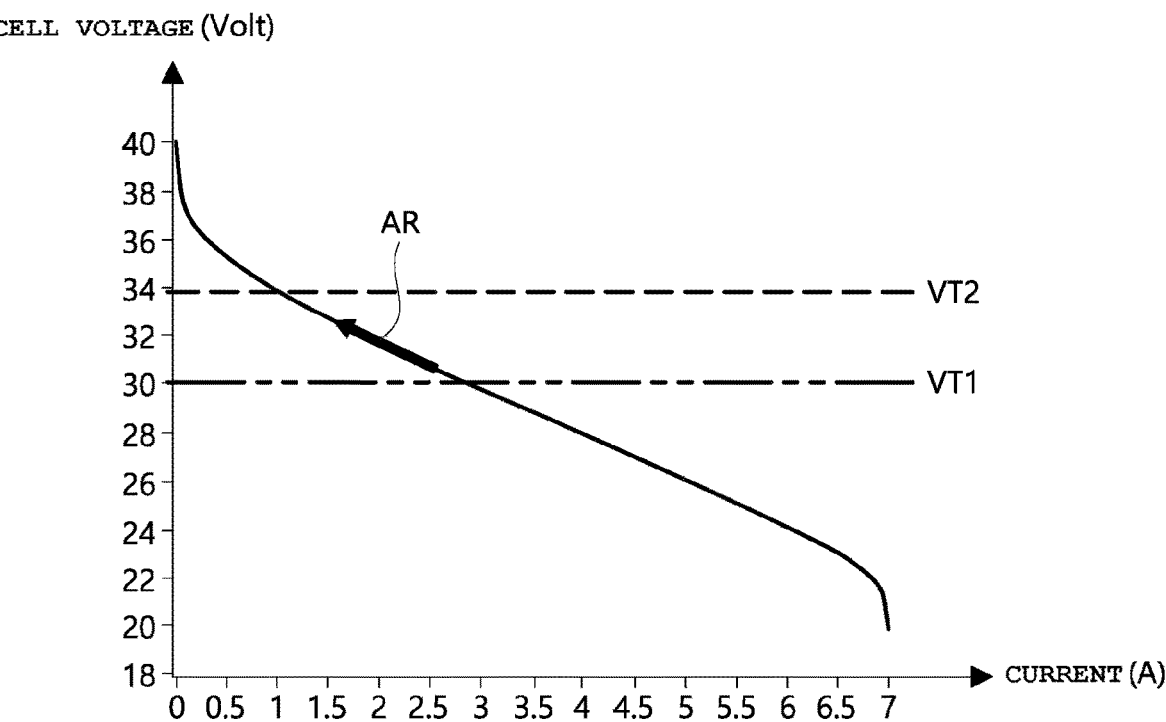
FIG. 6 is a graph indicating the voltage-current characteristics of a cell stack in the fuel cell vehicle according to the embodiment.

FIG. 6 is a graph indicating the voltage-current characteristics of the cell stack 110 in the fuel cell vehicle 100 according to the embodiment.

The fuel cell vehicle according to the comparative example uses the boost converter 120 because the stack voltage VS and the capacitor voltage VC have different levels. However, when the level of the stack voltage VS is higher than the level of the capacitor voltage VC, the boost converter 120 is damaged, and thus is not capable of being operated. That is, the first switching unit 150 is not capable of being switched on. In particular, before the fuel cell vehicle according to the comparative example is started up, the level of the stack voltage VS is similar to or higher than the level of the capacitor voltage VC. Therefore, after startup is requested, the boost converter 120 is not capable of being used until startup is completed. Therefore, in the fuel cell vehicle according to the comparative example, the initial charging converter 140 charges the supercapacitor 130 until the level of the capacitor voltage VC exceeds the level of the stack voltage VS.

That is, the startup control method of the fuel cell vehicle according to the comparative example is the same as the embodiment in that steps 210 to 218 shown in FIG. 3 are performed to charge the supercapacitor 130. In the startup control method of the fuel cell vehicle according to the comparative example, after step 218, when the level of the capacitor voltage VC exceeds the level of the stack voltage VS, the second switching unit 160 is switched off to disconnect the output side of the cell stack 110 from the initial charging converter 140, and then the first switching unit 150 is switched on to connect the output side of the boost converter 140 to the load 170 and to the supercapacitor 130, thereby completing startup.

However, referring to FIG. 4, because the level of the capacitor voltage VC exceeds the level of the stack voltage VS at a time of about 4 seconds, when the second switching unit 160 is switched off to disconnect the output side of the cell stack 110 from the initial charging converter 140 so that the initial charging converter 140 is turned off, the stack voltage VS reaches about 600V, which is higher than the capacitor voltage VC, and thus the boost converter 120 is not capable of being turned on. Therefore, even when the initial charging converter 140 is turned off, startup is completed only when the capacitor voltage VC exceeds about 600V, which is the stack voltage VS (at a time T1 of about 20 seconds).

In contrast, according to the embodiment, when the initial charging converter 140 has received the second target voltage from the cell stack 110 while the supercapacitor 130 is being charged through the initial charging converter 140 connected to the cell stack 110, the output side of the boost converter 120 is connected to the supercapacitor 130 to turn on the boost converter 120. In this case, as shown in FIG. 6, the level of the first target voltage VT1 is lower than the level of the second target voltage VT2, and thus the following Equation 3 is satisfied. Therefore, when the initial charging converter 140 follows a command related to the second target voltage VT2, the level of current supplied to the initial charging converter 140 from the cell stack 110 decreases and approaches zero, as indicated by the direction of the arrow AR in FIG. 6, and accordingly, the initial charging converter 140 stops operating, whereby startup is complete.

$$VT1 < VT2 < VC \qquad \text{[Equation 3]}$$

That is, according to the embodiment, when the boost converter 120 has received the first target voltage from the cell stack 110, the level of the second target voltage VT2 is higher than the level of the first target voltage VT1, and thus the initial charging converter 140 continues to receive the second target voltage VT2 from the cell stack 110. Accordingly, the current supplied to the initial charging converter 140 approaches zero, and thus the initial charging converter 140 is automatically turned off. Consequently, startup may be completed at a time T2 of about 4 seconds.

As a result, in the embodiment, the startup completion time may be greatly shortened from T1 to T2 compared to in the comparative example.

In addition, in the case of the comparative example, because it takes a lot of time to complete startup, post-processing operation needs to be performed to charge the supercapacitor 130 when the fuel cell vehicle 100 is turned off.

In contrast, in the case of the embodiment, it does not take as much time to complete startup as in the comparative example. Therefore, it is not necessary to perform post-processing operation when the fuel cell vehicle 100 is turned off.

In addition, in the case of the comparative example, a phenomenon of reversal between the capacitor voltage VC and the stack voltage VS needs to be considered. In contrast, in the case of the embodiment, it is not necessary to consider the reversal phenomenon, and thus freedom of selection of voltage bands of the cell stack 110 and the supercapacitor 130 is increased. The voltage bands of the supercapacitor 130 and the cell stack 110 are determined depending on the number of cells that are stacked. Even when the voltage band of the supercapacitor 130 and the voltage band of the fuel cell overlap each other, if the startup completion time is shortened using the embodiment, the number of cells that are stacked is not restricted, and thus freedom of selection of the voltage bands is increased.

As is apparent from the above description, according to the fuel cell vehicle, the method of controlling startup thereof, and the recording medium storing a program to execute the method of the embodiments, the startup completion time is shortened, post-processing operation is not required when the fuel cell vehicle is turned off, and freedom of selection of the voltage bands of the cell stack and the supercapacitor is increased.

However, the effects achievable through the disclosure are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A charging system for a fuel cell vehicle, comprising:
   a cell stack comprising a plurality of stacked unit cells;
   a boost converter configured to receive and boost a first target voltage from the cell stack and to output a boosted first target voltage;
   a supercapacitor;
   an initial charging converter configured to receive and boost a second target voltage from the cell stack and to output a boosted second target voltage;
   a first switching unit configured to be switched in response to a first control signal to connect an output side of the boost converter to the supercapacitor;
   a second switching unit configured to be switched in response to a second control signal to connect an output side of the cell stack to the initial charging converter; and
   a controller configured to generate the first control signal and the second control signal in order to connect the output side of the boost converter to the supercapacitor while an output from the initial charging converter is charged in the supercapacitor so that the supercapacitor is charged until startup is completed by receiving the first target voltage from the cell stack.

2. The charging system according to claim 1, further comprising:
   a load configured to be connected to the output side of the boost converter in response to a switching operation of the first switching unit.

3. The charging system according to claim 1, wherein the second target voltage has a level higher than a level of the first target voltage.

4. The charging system according to claim 1, wherein the controller is configured to generate the second control signal to connect the output side of the cell stack to the initial charging converter if a level of a capacitor voltage charged in the supercapacitor is equal to or lower than a level of a stack voltage output from the cell stack, wherein the controller is configured to generate the first control signal to connect the output side of the boost converter to the supercapacitor if the level of the capacitor voltage exceeds the level of the stack voltage and the supercapacitor is being charged, and wherein the controller is configured to generate the second control signal to disconnect the output side of the cell stack from the initial charging converter if the boost converter has received the first target voltage from the cell stack and the output side of the boost converter is connected to the supercapacitor.

5. The charging system according to claim 4, wherein the level of the capacitor voltage is determined to exceed the level of the stack voltage if the initial charging converter has received the second target voltage from the cell stack.

6. The charging system according to claim 1, wherein the second target voltage is determined in consideration of a minimum value of a duty ratio of the boost converter, and wherein the duty ratio is a duty ratio of a pulse width modulation (PWM) signal that drives the boost converter.

7. A method of controlling startup of a fuel cell vehicle, comprising:

providing a cell stack comprising a plurality of stacked unit cells, a boost converter configured to receive a first target voltage from the cell stack, a supercapacitor, and an initial charging converter configured to receive a second target voltage from the cell stack;

connecting an output side of the cell stack to the initial charging converter to charge the supercapacitor if startup of the fuel cell vehicle is requested and a level of a capacitor voltage charged in the supercapacitor is equal to or lower than a level of a stack voltage output from the cell stack;

connecting an output side of the boost converter to the supercapacitor to charge the supercapacitor if the level of the capacitor voltage exceeds the level of the stack voltage and the supercapacitor is being charged; and disconnecting the output side of the cell stack from the initial charging converter to complete startup if the boost converter has received the first target voltage from the cell stack and the output side of the boost converter is connected to the supercapacitor.

8. The method according to claim 7, wherein the second target voltage has a level higher than a level of the first target voltage.

9. The method according to claim 7, further comprising:

determining that the level of the capacitor voltage exceeds the level of the stack voltage if the initial charging converter has received the second target voltage from the cell stack.

10. The method according to claim 7, further comprising:

automatically stopping operation of the initial charging converter if the boost converter has received the first target voltage from the cell stack and the output side of the boost converter is connected to the supercapacitor.

11. A computer-readable recording medium, comprising:

a memory storage comprising a program containing computer executable code configured to execute a method of controlling startup of a fuel cell vehicle, the fuel cell vehicle comprising a cell stack comprising a plurality of stacked unit cells, a boost converter configured to receive a first target voltage from the cell stack, a supercapacitor, and an initial charging converter configured to receive a second target voltage from the cell stack, the program being configured to implement:

a function of connecting an output side of the cell stack to the initial charging converter to charge the supercapacitor if startup of the fuel cell vehicle is requested and a level of a capacitor voltage charged in the supercapacitor is equal to or lower than a level of a stack voltage output from the cell stack;

a function of connecting an output side of the boost converter to the supercapacitor if the level of the capacitor voltage exceeds the level of the stack voltage and the supercapacitor is being charged; and a function of disconnecting the output side of the cell stack from the initial charging converter to complete startup if the boost converter has received the first target voltage from the cell stack and the output side of the boost converter is connected to the supercapacitor.

12. The charging system of claim 1, further comprising the vehicle.

* * * * *